United States Patent
Brombaugh et al.

(10) Patent No.: US 6,362,701 B1
(45) Date of Patent: *Mar. 26, 2002

(54) DIGITAL COMMUNICATIONS MODULATOR HAVING AN INTERPOLATOR UPSTREAM OF A LINEARIZER AND METHOD THEREFOR

(75) Inventors: Eric Martin Brombaugh, Mesa; John M. Liebetreu, Scottsdale; Bruce A. Cochran, Mesa; Ronald D. McCallister, Scottsdale, all of AZ (US)

(73) Assignee: Sicom, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/709,885

(22) Filed: Nov. 9, 2000

Related U.S. Application Data

(63) Continuation of application No. 09/241,697, filed on Feb. 2, 1999.

(51) Int. Cl.[7] .............................................. H04L 27/20
(52) U.S. Cl. ...................... 332/103; 375/271; 375/295; 375/298; 708/313
(58) Field of Search ................................ 375/271, 298, 375/295; 332/153; 708/313; 455/126

(56) References Cited

U.S. PATENT DOCUMENTS

| | | | |
|---|---|---|---|
| 5,049,832 A | 9/1991 | Cavers | 330/149 |
| 5,287,387 A | 2/1994 | Birchler | 375/60 |
| 5,606,578 A | 2/1997 | O'Dea | 375/298 |
| 5,638,403 A | 6/1997 | Birchler et al. | 375/296 |
| 5,696,794 A | 12/1997 | O'Dea | 375/296 |
| 5,959,500 A | 9/1999 | Garrido | 330/151 |
| 5,978,420 A | 11/1999 | Koslov et al. | 375/295 |

OTHER PUBLICATIONS

Jussi Vesma and Tapio Saramaki, "Optimization and Efficient Implementation of Fir Filters With Adjustable Fractional Delay", 1997 IEEE, pp 2256–2259.

James E. Mazo and Jack Salz, "On the Transmitted Power in Generalized Partial Response", IEEE Transactions on Communications, vol.–Com–24, No. 3, Mar. 1976, pp 348–351.

*Primary Examiner*—Arnold Kinkead
(74) *Attorney, Agent, or Firm*—Lowell W. Gresham; Jordan M. Meschkow; Meschkow & Gresham, P.L.C.

(57) ABSTRACT

An IC modulation processor (28) may be configured to operate in a single chip mode to accommodate baud rates up to a maximum clock rate for the processor (28) and in a dual chip mode to accommodate baud rates in excess of the maximum clock rate. The IC modulation processor (28) performs digital processing on a communication signal which conveys an input data stream (22). A pulse shaping filter (54–57) is provided following a phase mapper (50). The pulse shaping filter (54–57) is implemented as a pair of half-filters. Pulse shaping is distributed between two IC modulation processors (28) in the dual chip mode. An interpolator (86) and linearizer (106) follow the pulse shaping filters (54–57).

20 Claims, 8 Drawing Sheets

DIGITAL COMMUNICATIONS MODULATOR HAVING AN INTERPOLATOR UPSTREAM OF A LINEARIZER AND METHOD THEREFOR

RELATED PATENTS

This is a continuation of "Digital Communications Modulator Having A Modulation Processor Which Supports High Data Rates," Ser. No. 09/241,697, filed Feb. 2, 1999, which is incorporated herein by reference.

TECHNICAL FIELD OF THE INVENTION

This invention relates generally to the field of high speed digital communications. More specifically, this invention relates to a digital communications modulator which accommodates a wide baud rate range.

BACKGROUND OF THE INVENTION

An infrastructure of high speed digital communications receivers has developed. A wide range of modulation formats is accommodated throughout this infrastructure. In addition to meeting the needs of this infrastructure, a need exists to perform digital communications at ever faster data rates, including rates faster than those commonplace in the high speed digital communications receiver infrastructure. A digital communications modulator able to accommodate such a wide range of data rates would be highly desirable.

One technique for increasing data rates is to communicate a greater amount of data per unit or baud interval and another technique is to increase the rate at which symbols are communicated (i.e. the baud or baud rate). Communicating a maximum amount of data per baud interval is particularly desirable when digital communications are transported through an RF medium because bandwidth does not increase in response to increases in the amount of data per baud interval, assuming transmission power levels remain constant. However, a point of diminishing returns is quickly reached where increasing the amount of data per baud interval leads to excessive bit error rates. Accordingly, to further increase data rates, baud rates need to increase, and in RF applications the increased baud rates are desirably supported by increasing the bandwidth requirements no more than absolutely necessary.

Conventional modulators operate at a clock rate greater than or equal to the baud rate. In other words, data processing modulation functions, such as encoding, phase mapping, pulse shaping, peak power reduction, preceding, and the like, occur in a pipe-lined fashion at a clock rate at or above the baud rate. From a maximum baud rate achievable with a maximum clock rate, lower baud rates may easily be achieved simply by lowering the clock rate.

Modern high speed digital communications modulators perform a large amount of digital processing functions using a massive number of active semiconductor devices. Accordingly, such modulation processing functions are desirably implemented, as much as possible, using very large scale integration semiconductor process technologies. For example, complementary metal oxide semiconductor (CMOS) is currently a desirable semiconductor process technology because of its low power, low cost, and high density integration properties. Unfortunately, the maximum clock rate supported by the CMOS process results in an undesirably low baud rate using the conventional technique of processing data using a clock rate greater than or equal to the baud rate.

One technique for increasing the baud rate would be to use an alternate semiconductor process technology which supports higher clock rates. Unfortunately, this approach has a highly undesirable consequence. The currently available semiconductor technologies supporting clock rates higher than those supported by the CMOS process tend to consume more power than the CMOS process and tend to be much more expensive than the CMOS process. Moreover, such processes tend to support a lower degree of integration than CMOS. In other words, fewer active semiconductor devices can be placed on an integrated circuit. Consequently, numerous, expensive, high power integrated circuits would be required to perform the same digital communications modulation functions at a higher clock rate than may otherwise be performed at a lower clock rate in a single, low power, low cost CMOS integrated circuit.

Accordingly, a high speed digital communications modulation processing architecture which supports a variety of baud rates, including a baud rate in excess of the clock rate, is needed. Such an architecture could be implemented using a low cost, low power, highly integratable semiconductor process technology, such as CMOS to form a low power, low cost, highly reliable modulator or modulator family.

SUMMARY OF THE INVENTION

Accordingly, it is an advantage of the present invention that an improved high speed digital communications modulator is provided.

Another advantage is that a high speed digital communications modulator performs digital communications processing to achieve a baud rate in excess of the clock rate.

Another advantage is that a high speed digital communications modulator includes two integrated circuit (IC) modulation processors which operate in parallel.

Another advantage is that a digital communications IC modulation processor may be used alone to support baud rates up to a maximum clock rate for the IC modulation processor, and may be used in parallel with another such IC modulation processor to support baud rates in excess of the maximum clock rate for the IC modulation processor.

Another advantage is that a high speed digital communications modulator is provided in which the pulse shaping function is performed using two half-filters which may be located on the same IC modulation processor or on different IC modulation processors.

Another advantage is that an RF power amplifier linearizer is preceded by an interpolator that increases the number of samples per baud interval so that spectral components in excess of the baud rate introduced by the linearizer are not substantially aliased back into the communications passband.

The above and other advantages of the present invention are carried out in one form by a digital communications modulator that includes a data splitter configured to split an input data stream into a plurality of input substreams. A plurality of phase mappers couple to the data splitter, and each of the phase mappers is configured to generate a phase-mapped substream from one of the input substreams. A plurality of pulse shaping filters couple to the plurality of phase mappers, and each of the pulse shaping filters is configured to generate a shaped substream from one of the phase-mapped substreams. A substream combiner couples to two of the plurality of pulse shaping filters. The substream combiner combines two of the shaped substreams into a combined shaped substream.

The above and other advantages are carried out in another form by a digital communications modulator having a phase mapper configured to generate a phase-mapped data stream. The modulator also has a pulse shaping filter that is configured to generate a shaped data stream from the phase-mapped data stream. An interpolator has an input responsive to the shaped stream and has an output. A radio frequency (RF) power amplifier linearizer has an input responsive to the interpolator output.

The above and other advantages are carried out in another form by a digital communications modulator that includes a phase mapper configured to generate a phase-mapped data stream. The modulator also includes a tapped delay line that has a plurality of cascaded delay stages and an input adapted to receive the phase-mapped data stream. A coefficient scaling section couples to the tapped delay line. A summing section couples to the coefficient scaling section, and a multiplexing section couples to the tapped delay line to selectively enable and disable a portion of the delay stages. The phase mapper, tapped delay line, coefficient scaling section, and summing section are located on a common semiconductor substrate, and the multiplexing section is controlled by signals supplied externally from the substrate.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

In the Figures and this description, various components are distinguished from their similar or identical counterparts through prime (') and double-prime (") suffixes in respective reference numbers. Reference numbers used herein without suffixes indicate either a component or its counterpart individually or both components collectively.

Figure 1:
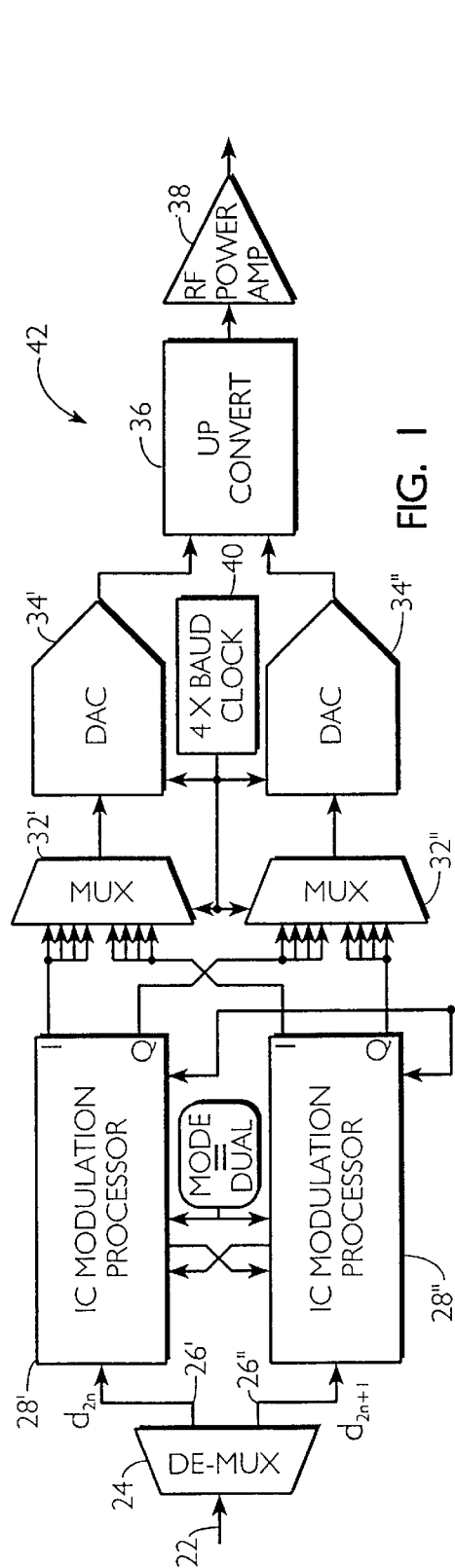
FIG. 1 shows a block diagram of a dual chip embodiment of a digital communications modulator configured in accordance with the teaching of the present invention.

FIG. 1 shows a block diagram of a dual chip embodiment of a digital communications modulator 20' configured in accordance with the teaching of the present invention. In dual chip embodiment 20', an input data stream 22 is provided to an input of a demultiplexer (de-mux) 24. Input data stream 22 need not be a mere block of data but may be a continuous or at least indeterminate sequence of data to be transmitted. Demultiplexer 24 splits input data stream 22 into even and odd data substreams 26' and 26", which are respectively supplied to even and odd integrated circuit (IC) modulation processors 28' and 28". The terms even and odd are used herein merely as labels that distinguish one item from another and do not limit the present invention in any way.

While the preferred embodiment splits data stream 22 into alternating bytes of data, the precise manner in which demultiplexer 24 splits input data stream 22 is not a critical feature. Generally, alternating chunks of data from input data stream 22, which chunks may include from one to eight or even more bits of data, are routed into even and odd data substreams 26' and 26".

Figure 2:
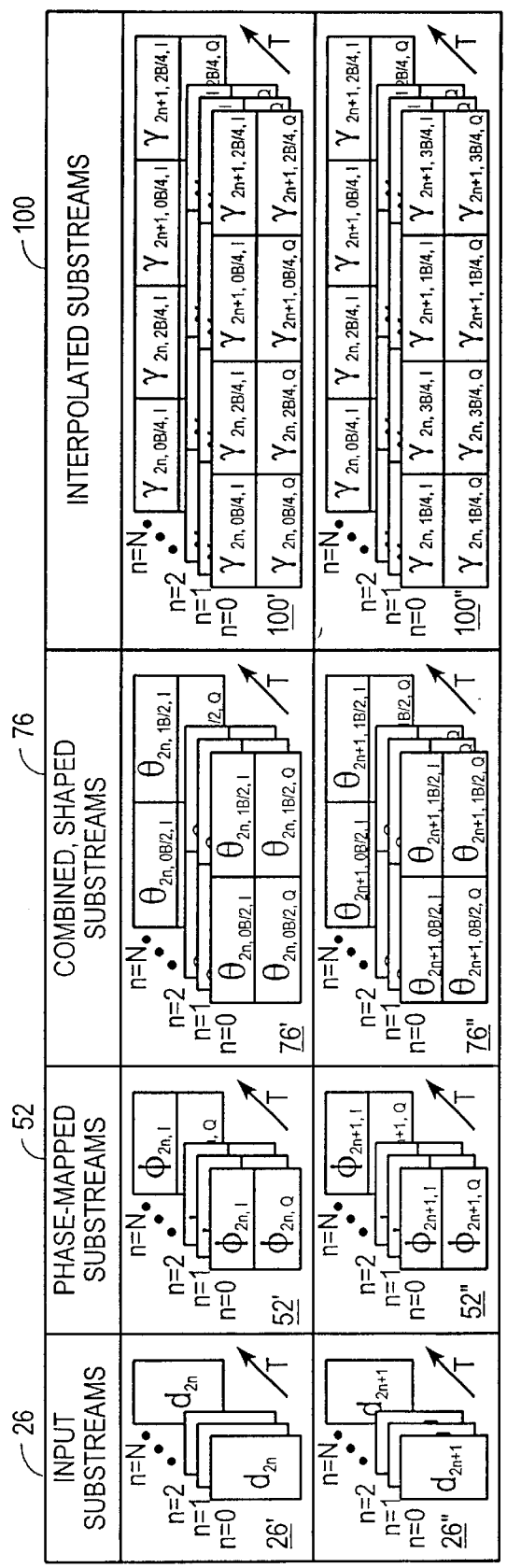
FIG. 2 shows a chart that identifies various samples or data values present during each clock cycle at various points in the dual chip embodiment of the digital communications modulator of FIG. 1.

FIG. 2 shows a chart that identifies various samples or data values present during each clock cycle at various points in the dual chip embodiment of digital communications modulator 20'. Referring to FIGS. 1 and 2, for each cycle "n" of a clock signal, data chunk $d_{2n}$ is routed into even input substream 26' and data chunk $d_{2n+1}$ is routed into odd input substream 26". A clock generator 30' generates this clock signal, the cycles of which are referenced with the subscript "n". The clock signal is routed to IC modulation processors 28. The baud rate for modulator 20' is one-half of the rate of this clock signal. When modulator 20' is operated at its maximum baud rate, the clock signal is desirably at the maximum rate tolerated by IC modulation processors 28. Thus, each of IC modulation processors 28' and 28" operate at a clock rate that is less than the baud rate.

For convenience, the phrase baud rate is used herein synonymously with baud, and the phrase baud interval is used synonymously with unit interval. The unit or baud interval represents the reciprocal of the baud or baud rate. During each baud interval, modulator 20 transmits a unit of data, which unit may include one or more bits, as a complex phase point having first and second orthogonal components, such as in-phase (I) and quadrature (Q) components or phase ($\phi$) and magnitude (M) components. When the unit of data includes only one bit of data, the baud rate equals the data rate, but when the unit of data includes more than one bit of data, the baud rate is less than the data rate. A collective phase point rate for modulator 20 equals the baud rate.

Referring to FIG. 1, various signals are supplied to each IC modulation processor 28 from the other. Likewise, various signals are supplied externally from each IC modulation processor 28 to program IC modulation processors 28 to operate in the dual chip mode. The dual mode signals may be supplied through dedicated input pins on IC modulation processors 28 or may be supplied through a common data bus which couples to a controller that is omitted from the Figures to simplify the drawings.

During each clock cycle, each IC modulation processor 28 outputs four, complex digital phase point values, for a total of eight complex phase points. Eight, in-phase (I) components from IC modulation processors 28 per clock cycle are routed to a first multiplexer (mux) 32', and eight quadrature (Q) components from IC modulation processors 28 per clock cycle are routed to a second multiplexer (mux) 32". Outputs from multiplexers 32' and 32" couple to inputs of digital-to-analog converters (DACs) 34' and 34", respectively. In the preferred embodiments, outputs of digital-to-analog converters 34 couple to an up-conversion section 36. An output of up-conversion section 36 couples to an input of a radio frequency (RF) power amplifier 38, from which a transmission signal is provided for broadcasting from a suitable antenna (not shown).

As discussed above, IC modulation processors 28 operate at a clock rate one-half the baud rate. In contrast, a clock generator 40 provides a clock signal that oscillates at four times the baud rate (i.e. eight times the clock rate for IC modulation processors 28). This clock signal is routed to multiplexers 32, perhaps through a counter (not shown) to alternately select the eight inputs to each multiplexer 32 per IC modulation processor clock cycle. Likewise this four-times-baud clock signal is also routed to digital-to-analog converters 34 so that four separate complex conversions are performed during each baud interval.

End components 42 of modulator 20' include multiplexers 32, clock generator 40, digital-to-analog converters 34, and components downstream thereof. As discussed above, when modulator 20' is operated at its maximum baud rate, the one-half baud rate clock upon which IC modulation processors 28 operate is desirably at the maximum rate tolerated by IC modulation processors 28. Since end components 42 operate at a rate faster than this maximum rate, end components 42 are desirably formed using a different semiconductor process than that of IC modulation processors 28. In the preferred embodiment, IC modulation processors 28 are formed using a CMOS process while end components 42 are formed using an ECL or SiGe process. However, end components 42 require only a few active semiconductor devices compared to the large number of active semiconductor devices included in each of IC modulation processors 28. Accordingly, end components 42 may be either combined or maintained as separate integrated circuits using the low scale integration techniques that are characteristic of high speed semiconductor processes.

Figure 3:
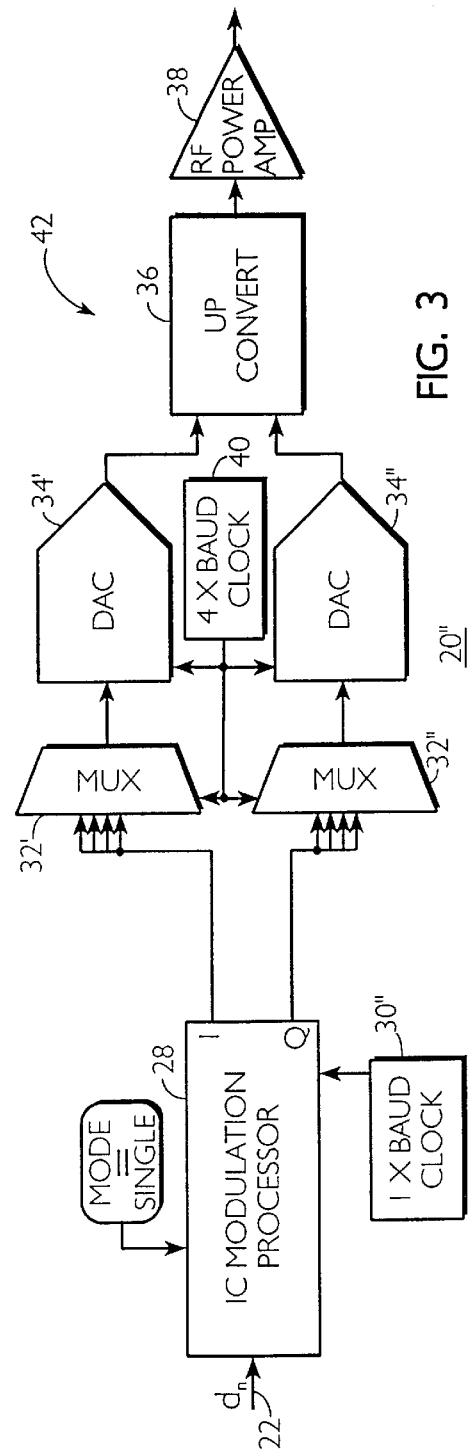
FIG. 3 shows a block diagram of a single chip embodiment of a digital communications modulator configured in accordance with the teaching of the present invention.
Figure 4:
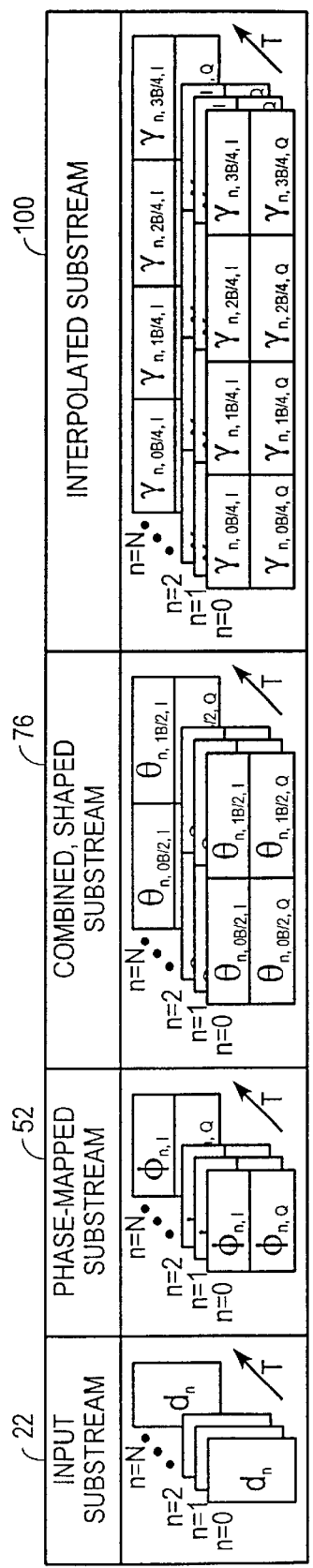
FIG. 4 shows a chart that identifies various samples or data values present during each clock cycle at various points in the signal chip configuration of the digital communications modulator of FIG. 3.

FIG. 3 shows a block diagram of a single chip embodiment of a digital communications modulator 20" configured in accordance with the teaching of the present invention. FIG. 4 shows a chart that identifies various samples or data values present during each clock cycle at various points in the signal chip configuration of modulator 20".

As shown in FIGS. 1, 3 and 4, modulator 20" differs little from modulator 20' (FIG. 1). Modulators 20' and 20" differ in that input data stream 22 is supplied, in its entirety, to the data input of a single IC modulation processor 28 in modulator 20". Mode signals supplied from outside of or external to IC modulation processor 28 program IC modulation processor 28 to operate in the single chip mode, and no signals are cross coupled with another IC modulation processor because modulator 20" includes only the single IC modulation processor 28.

This single IC modulation processor 28 is driven by a clock signal from a clock generator 30" that oscillates at the baud rate, in contrast to the one-half baud rate clock signal of modulator 20'. For each cycle "n" of this baud rate clock signal, data chunk $d_n$ is routed to the data input of IC modulation processor 28, in contrast to chunks $d_{2n}$ and $d_{2n+1}$ in modulator 20'. End components 42 of modulator 20" may be identical to end components 42 of modulator 20', except that each of multiplexers 32 need respond to only four different input signals for modulator 20".

When modulator 20" is operated at its maximum baud rate, the baud rate-clock signal at which IC modulation processor 28 operates is desirably at the maximum rate tolerated by IC modulation processor 28. Accordingly, modulator 20" has a maximum baud rate approximately one-half the maximum baud rate of modulator 20'. However, nothing prevents modulator 20' from being operated at a baud rate one-half its maximum baud rate or at any other baud rate less than its maximum baud rate. Moreover, the same integrated circuit component that is used as IC modulation processor 28 in unity in modulator 20" is used in duplicate in modulator 20'. Accordingly, a low power component, which can be integrated and mass produced at low cost, can serve a wide range of baud rates, including baud rates in excess of the maximum clock rate tolerated by the component.

Figure 5:
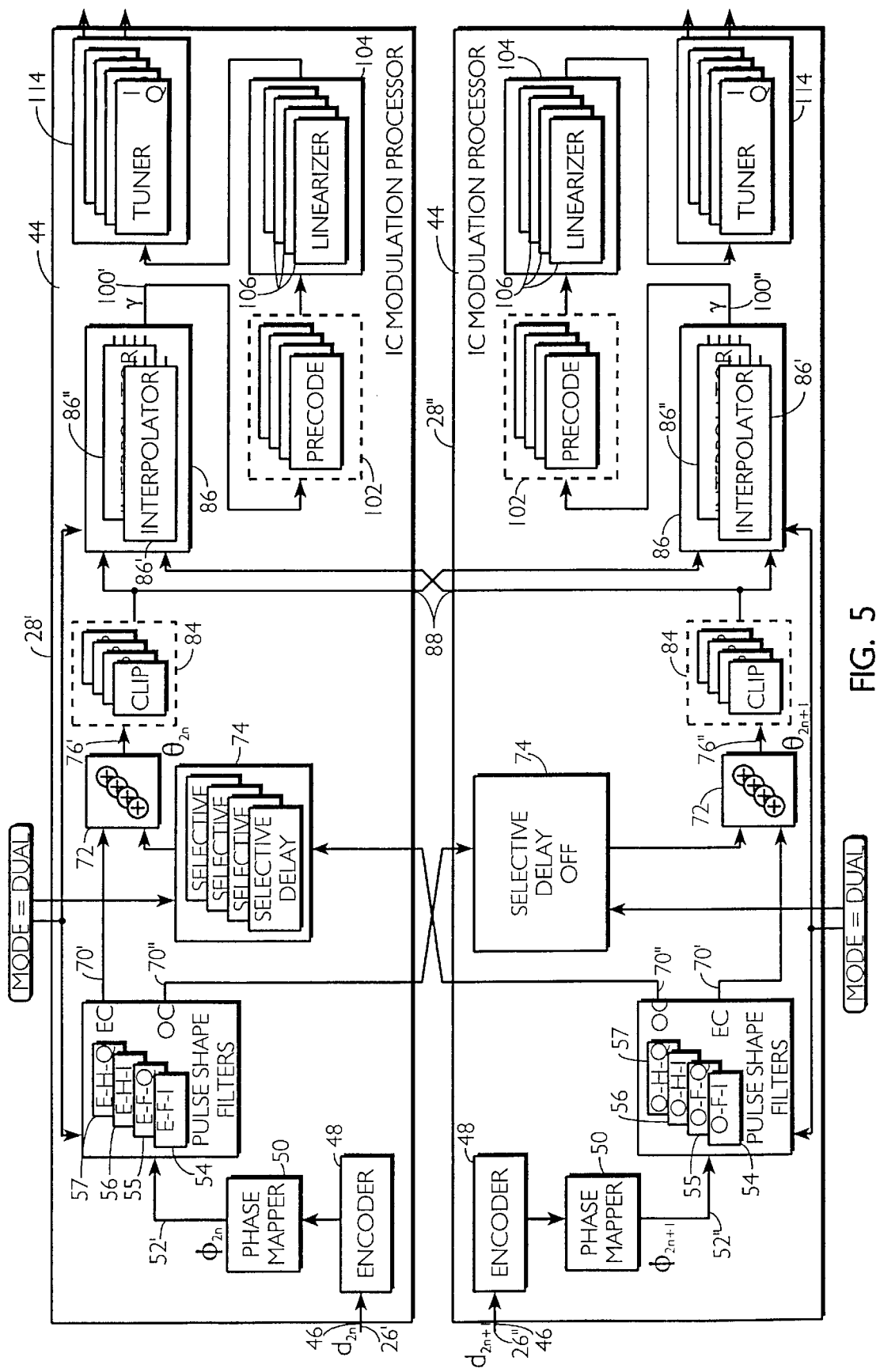
FIG. 5 shows a block diagram of two IC modulation processors mutually configured in accordance with the dual chip embodiment of FIG. 1.
Figure 6:
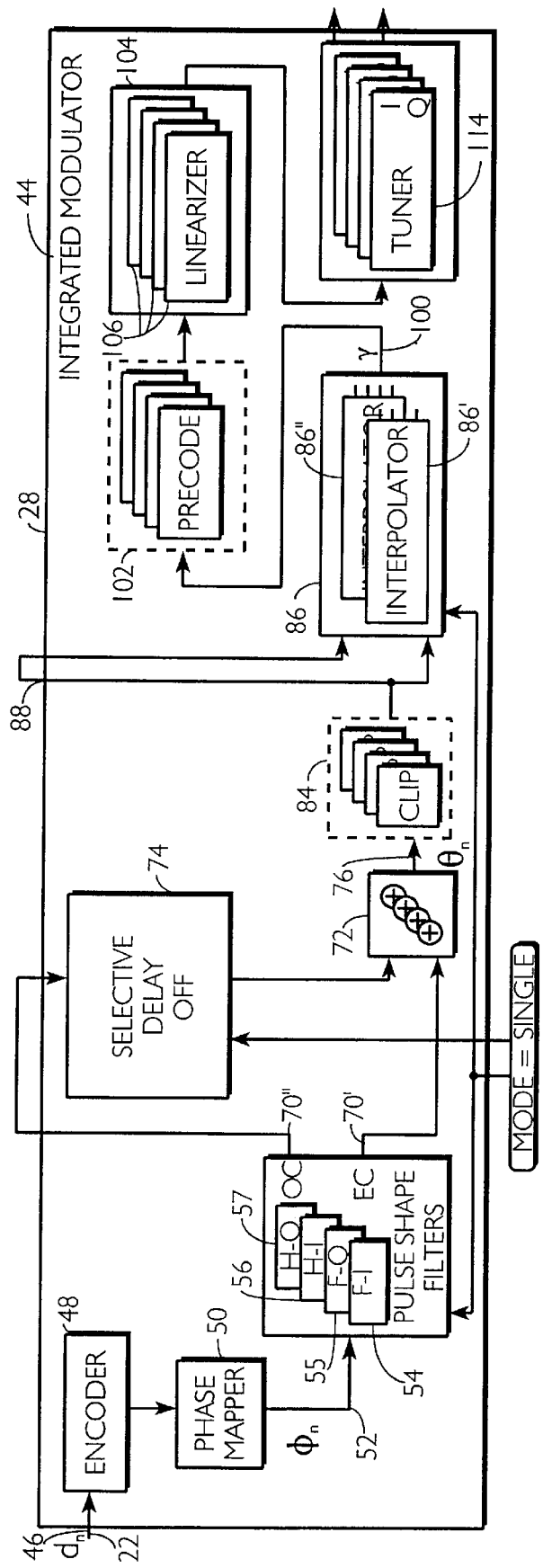
FIG. 6 shows a block diagram of an IC modulation processor configured in accordance with the single chip embodiment of FIG. 3.

FIG. 5 shows a block diagram of two IC modulation processors 28 mutually configured in accordance with the dual chip embodiment of modulator 20' (FIG. 1). FIG. 6 shows a block diagram of a single IC modulation processor 28 configured in accordance with the single chip embodiment of modulator 20" (FIG. 3). Referring to FIGS. 5–6, for the sake of clarity the Figures omit specific reference to the clock signal provided by clock generators 30 (FIGS. 1 and 3). The reader may assume that this clock signal is routed to all blocks illustrated in FIGS. 5–6. Likewise, the Figures omit specific reference to a controller which couples to the various blocks illustrated in FIGS. 5–6 to provide programming and control data that may change from time to time and from application to application.

Each IC modulation processor 28 is formed on its own semiconductor substrate 44. Those skilled in the art will appreciate that the functional blocks illustrated in FIGS. 5–6 are implemented using active semiconductor devices formed on substrate 44 using a semiconductor process such as CMOS that is suitably adapted for the large scale integration needed to implement the functions of each IC modulation processor 28.

An input 46 of IC modulation processor 28 receives data to be digitally processed prior to transmission. In the dual mode (FIG. 5), even input data substream 26', which consists of data $d_{2n}$, is received at input 46 of IC modulation processor 28' while odd input data substream 26", which consists of data $d_{2n+1}$, is received at input 46 of IC modulation processor 28". In the single chip mode (FIG. 6), input data substream 22, which consists of data $d_n$ is received at input 46 of IC modulation processor 28. This input data substream 26 or stream 22 is routed to an encoder block 48.

Encoder block 48 performs various types of encoding which are known to those skilled in the art of digital communications. For example, in the preferred embodiment, encoder block 48 implements a concatenated encoding scheme which includes block encoding followed by convolutional encoding. Interleaving, differential encoding and puncturing functions known in the art may also be included in encoder block 48.

The encoded data from encoder block 48 are routed to a phase mapper 50. Phase mapper 50 phase-maps the encoded data into a phase-mapped substream 52. For either the dual mode or the single chip mode of operation, during each clock cycle phase mapper 50 translates a unit of encoded data, which unit may include one or more bits, into a complex phase point in accordance with a definition provided by a predetermined phase constellation. The preferred embodiment utilizes a polar phase constellation in which phase points are arranged in concentric rings, however, the precise nature of the phase constellation is not a critical feature in the present invention.

As indicated in the chart of FIG. 2, dual mode modulator 20' (FIG. 5) generates an even phase-mapped substream 52' consisting of phase points $\phi_{2n,I}$ and $\phi_{2n,Q}$ in IC modulation processor 28' and an odd phase-mapped substream 52" consisting of phase points $\phi_{2n+1,I}$ and $\phi_{2n+1,Q}$ in IC modulation processor 28", where n represents the period of the clock signal driving IC modulation processors 28. In dual mode modulator 20' two phase mappers 50 operate in parallel on different portions of input data stream 22 (FIG. 1). Collectively, these two phase mappers 50 provide a single, complex phase point having orthogonal components per baud interval; however, each phase mapper 50 generates less than a single phase point per baud interval.

As indicated in the chart of FIG. 4, single mode modulator 20" (FIG. 6) generates a phase-mapped substream 52 consisting of phase points $\phi_{n,I}$ and $\phi_{n,Q}$ in IC modulation processor 28. In the single mode, phase mapper 50 provides a single, complex phase point per baud interval.

Phase mapped substream 52 from phase mapper 50 is routed to inputs of pulse shaping filters 54, 55, 56 and 57. Within a given IC modulation processor 28, each pulse shaping filter 54–57 receives the same phase mapped substream 52 input and each operates in parallel. In other words, each of filters 54–57 may receive the same phase point input at the same time, be clocked by the same clock signal, and progress through internal tapped delay lines (discussed below) at the same rate.

Filters 54 and 56 are dedicated to shaping in-phase (I) components of phase mapped substream 52 while filters 55 and 57 are dedicated to shaping quadrature (Q) components. Filters 54 and 55 are dedicated to generating a shaped substream representative of first portions baud intervals, while filters 56 and 57 are dedicated to generating a shaped substream representative of second portions baud intervals. For example, the first portion may correspond to full (F) baud interval instants and the second portion may correspond to half (H) baud interval instants.

Each of pulse shaping filters 54–57 is desirably implemented as a pair of half-filters having even coefficient (EC) and odd coefficient (OC) outputs. In dual mode modulator 20', the pulse shaping filter function is performed using half-filters from both IC modulation processors 28. In single mode modulator 20", the pulse shaping filter function is performed using an entire half-filter pair from the single IC modulation processor 28.

Figures 7, 8:
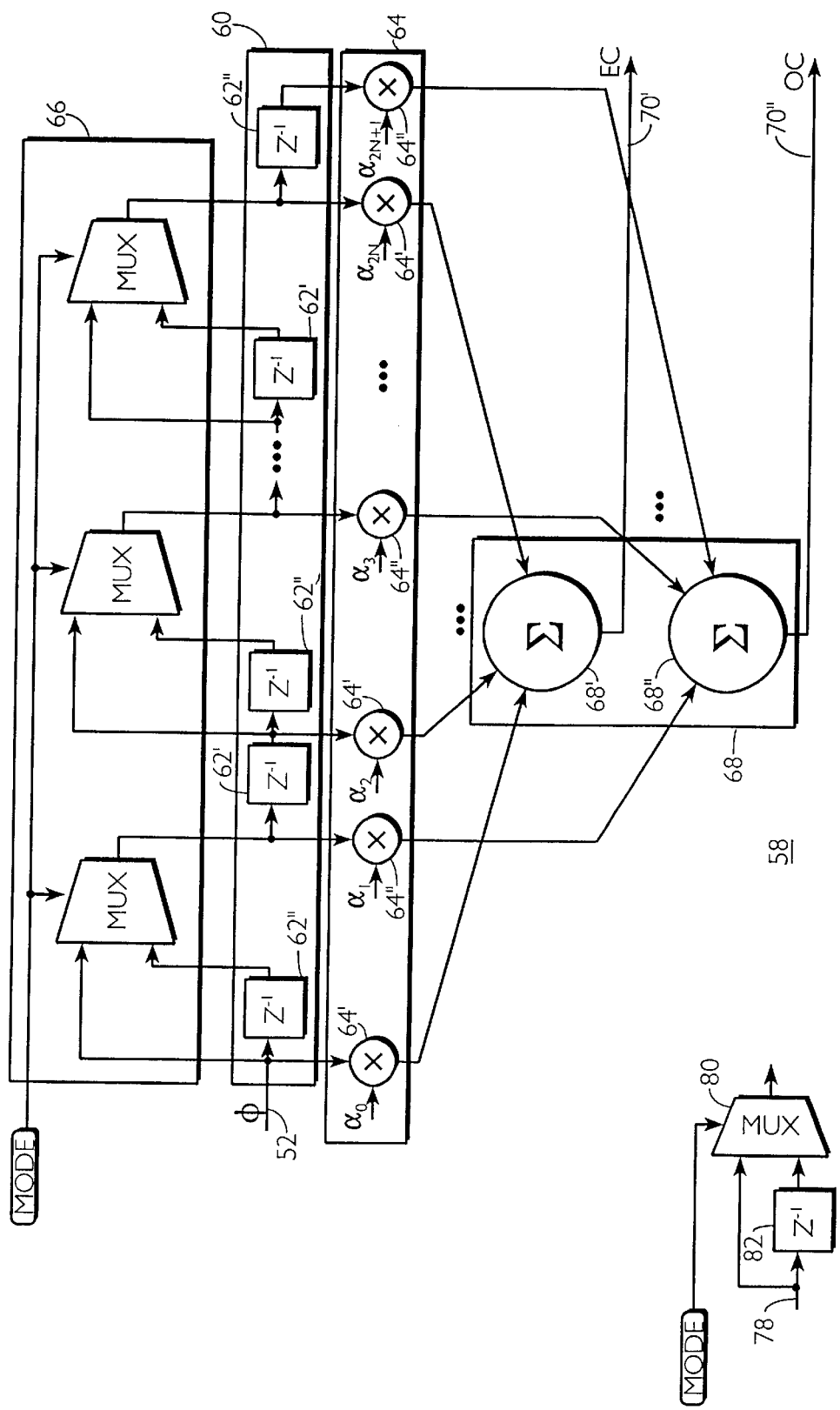
FIG. 7 shows a block diagram of a pulse shaping filter configured as a pair of half-filters, the pulse shaping filter being used in the IC modulation processor of FIGS. 5 and 6.
FIG. 8 shows a block diagram of a selectable delay element used in the IC modulation processor of FIGS. 5 and 6.

FIG. 7 shows a block diagram of a pulse shaping filter 58 which may suffice for each of pulse shaping filters 54–57. Data $\phi$ from phase-mapped substream 52 are routed to an input of a tapped delay line 60. Tapped delay line 60 includes any number of cascaded delay stages 62. Tapped delay line 60 couples to a coefficient scaling section 64 and a multiplexing section 66. Coefficient scaling section 64 couples to a summing section 68 that produces even and odd shaped substreams at even coefficient (EC) and odd coefficient (OC) outputs 70' and 70", respectively.

Delay stages 62 are arranged within tapped delay line 60 as alternating even delay stages 62' and odd delay stages 62". The output of each even delay stage 62' couples to an input of a subsequent odd delay stage 62", an input of a multiplexer (mux) in multiplexing section 66 and an even coefficient multiplier 64' in coefficient scaling section 64. The output of each odd delay stage 62" couples to an input of the same multiplexer to which its previous even delay stage 62' output coupled. The output of each multiplexer from multiplexing section 66 couples to an input of a subsequent even delay stage 62' and an odd coefficient multiplier 64" in coefficient scaling section 64. Even coefficients $\alpha_{0-2n}$ and odd coefficients $\alpha_{1-2n+1}$ are provided to even and odd coefficient multipliers 64' and 64", respectively. Desirably, the even and odd coefficients are supplied from external to IC modulation processor 28 by a controller (not shown). The multiplexers in multiplexing section 66 are all controlled by a mode signal supplied from external to IC modulation processor 28. Outputs of even coefficient multipliers 64' couple to inputs of an even adder 68' of summing section 68, and outputs of odd coefficient multipliers 64" couple to inputs of an odd adder 68" of summing section 68. Even adder 68' supplies the even shaped substream at coefficient output 70', and odd adder 68" supplies the odd shaped substream at odd coefficient output 70".

A predetermined inter-symbol interference (ISI) minimizing, pulse shaping function, such as the well known, raised cosine, root Nyquist, pure Nyquist or others, can be applied to a data stream through a conventional finite impulse response (FIR) filter having a predetermined configuration of even and odd coefficients and being clocked at the baud rate. Such pulse shaping filters significantly reduce the bandwidth requirements of the signal that will communicate input data stream 22 and are highly desirable in RF applications where numerous channels are required to coexist in a limited amount of RF spectrum. The nature of such a FIR filter configuration is well known to those skilled in the art and is not discussed herein. Such a spreading function is desirably implemented by pulse shaping filter 58.

In the single chip mode of operation, multiplexing section 66 enables odd delay stages 62" of tapped delay line 60. Outputs from even delay stages 62' are routed directly to subsequent odd delay stages 62" and from odd delay stages 62" to subsequent even delay stages 62' through multiplexing section 66. Consequently, in the single chip mode of operation, pulse shaping filter 58 is clocked at the baud rate and forms a FIR filter when the even and odd shaped substreams from even and odd 10 coefficient outputs 70' and 70", respectively, are combined through adding.

Referring to FIGS. 6 and 7, the even shaped substream from even coefficient output 70' is routed directly to a first input of an adder in a substream combiner section 72. Substream combiner section 72 includes a separate adder for each of pulse shaping filters 54–57. The odd shaped substream from odd coefficient output 70" is routed off then back on to IC modulation processor 28, where it is received at a selective delay block 74. In the single chip 20 mode of operation, the delay function of selective delay block 74 is turned off, and the odd shaped substream is immediately routed to a second input of the corresponding adder in substream combiner section 72. Accordingly, even and odd shaped substreams are combined through adding in substream combiner section 72.

Referring back to the chart of FIG. 4 and to FIG. 6, the four adders of substream combiner section 72 collectively generate four combined, shaped substreams 76. Combined shaped substreams 76 exhibit values $\theta_{n,0B/2,I}$, $\theta_{n,0B/2,Q}$, $\theta_{n,1B/2,I}$ and $\theta_{n,1B/2,Q}$, during each clock cycle or baud interval n, where "I" and "Q" represent orthogonal components of a complex signal, "0B/2" represents the instant in time occurring at the beginning of a baud interval, and "1B/2" represents the instant in time occurring in the middle of a baud interval.

Referring to FIGS. 5 and 7, in the dual mode of operation, multiplexing section 66 disables odd delay stages 62" of tapped delay line 60. Outputs from even delay stages 62' are routed to subsequent odd and even delay stages 62" and 62', while the outputs from odd delay stages 62" are merely ignored and not passed through multiplexing section 66. Pulse shaping filter 58 and its counterpart in the other IC modulation processor 28 together form the parallel-decomposed equivalent of a single FIR filter which collectively processes the entirety of input data stream 22 as represented in even and odd phase-mapped substreams 52' and 52" at the baud rate, even though both pulse shaping filters 58 operate at only one-half the baud rate. In other words, pulse shaping filter 58 and its counterpart in the other IC modulation processor 28 collectively process more than one phase point per clock interval of either IC modulation processor 28.

In effect, a conventional FIR filter tapped delay line having taps 0 through 2N+1 and clocked at the baud rate is replaced in the preferred embodiment by four tapped delay lines, each of length N+1, and each running at one-half the baud rate. Two of the four half baud rate tapped delay lines are located on each of two IC modulation processors 28.

The odd shaped substreams generated at odd coefficient output 70" of the pulse shaping filters 54–57 which process even phase-mapped substream 52' are added with the corresponding even shaped substreams generated at the even coefficient output 70' of the pulse shaping filters 54–57 which process odd phase-mapped substream 52". Likewise, the even shaped substreams generated at even coefficient output 70' of the pulse shaping filters 54–57 which process even phase-mapped substream 52' are added with corresponding odd shaped substreams generated at the odd coefficient output 70" of the pulse shaping filters 54–57 which process odd phase-mapped substream 52". However, in order to make the timing align correctly, the odd shaped substream from the pulse shaping filters 54–57 which process odd phase-mapped substream 52" are delayed one clock cycle before adding with even coefficient outputs 70' obtained from processing even phase-mapped substream 52'.

In this dual chip embodiment, the odd shaped substream from odd coefficient output 70" is routed off each IC modulation processor 28 then on to the other IC modulation processor 28, where it is received at selective delay element 74. In the dual chip mode of operation, the delay function of selective delay element 74 is turned off in IC modulation processor 28", and the odd shaped substream generated by IC modulation processor 28' is immediately routed to the second input of the corresponding adder in substream combiner section 72 of IC modulation processor 28". However, the delay function of selective delay element 74 is turned on in IC modulation processor 28', and the odd shaped substream generated by IC modulation processor 28" is routed to the second input of the corresponding adder in substream combiner section 72 of IC modulation processor 28' after being delayed one clock cycle.

Accordingly, even and odd shaped substreams are combined in IC modulation processor 28' for even baud intervals and are combined in IC modulation processor 28" for odd baud intervals. Referring back to the chart of FIG. 2 and to FIG. 5, the four adders of the two substream combiner sections 72 collectively generate eight combined, shaped substreams 76. In IC modulation processor 28', combined shaped substreams 76' exhibit values $\theta_{2n,0B/2,I}$, $\theta_{2n,0B/2,Q}$, $\theta_{2n,1B/2,I}$ and $\theta_{2n,1B/2,Q}$, during each clock cycle n, where "I" and "Q" represent orthogonal components of a complex signal, "0B/2" represents the instant in time occurring at the beginning of a baud interval, and "1B/2" represents the instant in time occurring in the middle of a baud interval. In IC modulation processor 28", combined shaped substreams 76" exhibit values $\theta_{2n+1,0B/2,I}$, $\theta_{2n+1,0B/2,Q}$, $\theta_{2n+1,1B/2,I}$ and $\theta_{2n+1,1B/2,Q}$, during each clock cycle n.

FIG. 8 shows a block diagram of selectable delay element 74. The shaped substream routed through selectable delay element 74 is applied at an input 78. Input 78 couples to a first input of a multiplexer (mux) 80 and to an input of one clock cycle delay stage 82. An output of delay stage 82 couples to a second input of multiplexer 80, and a selection input of multiplexer 80 couples to a mode control signal received from external to IC modulation processor 28. Referring to FIGS. 5, 6 and 8, this mode control signal is set to route the shaped substream directly through multiplexer 80 without passing through the one clock cycle delay of delay stage 82 in the single chip mode and for IC modulation processor 28" in the dual chip mode. This mode control signal is set to route the shaped substream through delay stage 82 for IC modulation processor 28' in the dual chip mode.

Referring back to FIGS. 5–6, the combined, shaped substreams 76 are routed from combiner 72 through an optional clipping section 84 to an input of an interpolator section 86 and to pins 88 which allow the combined, shaped substreams to exit IC modulation processor 28. Clipping section 84 is omitted in the preferred embodiment, but may be included in alternate embodiments.

As understood by those skilled in the art, clipping section 84 implements a peak-to-average power ratio reduction function. By limiting the peak-to-average power ratio, RF power amplifier 38 (FIGS. 1 and 3) may be used more efficiently. In particular, when the phase constellation implemented by phase mapper 50 is not a constant envelope constellation, a linear RF power amplifier 38 is used. If such a linear amplifier is driven beyond its linear range of operation, spectral regrowth results. By limiting the peak-to-average power ratio, transmissions can occur at a greater power level without encountering spectral regrowth. Desirably, clipping is implemented in a soft rather than hard manner so that the clipping function itself introduces as little spectral regrowth as possible.

Interpolator section 86 is configured to receive up to eight input substreams in parallel. As discussed above, substream combiner 72 on each IC modulation processor 28 produces four combined, shaped substreams 76. In other words, each IC modulation processor 28 generates four combined shaped substream 76 values of θ for each clock cycle (FIGS. 2 and 4). In the single chip mode illustrated in FIG. 6, these four substreams 76 may be provided in duplicate to interpolator section 86 by routing them back onto IC modulation processor 28 from exit pins 88. In the dual chip mode illustrated in FIG. 5, these four substreams 76 are passed from exit pins 88 to the interpolator section 86 on the other IC modulation processor 28. Thus, in the dual chip mode, interpolator section 86 receives eight unique combined substreams 76, and in the single chip mode, interpolator 86 receives four unique combined substreams 76. In the preferred embodiment, each interpolator section 86 includes two interpolators for independently interpolating orthogonal components (e.g. I and Q) of the combined, shaped substreams 76 to which they are responsive.

Figure 9:
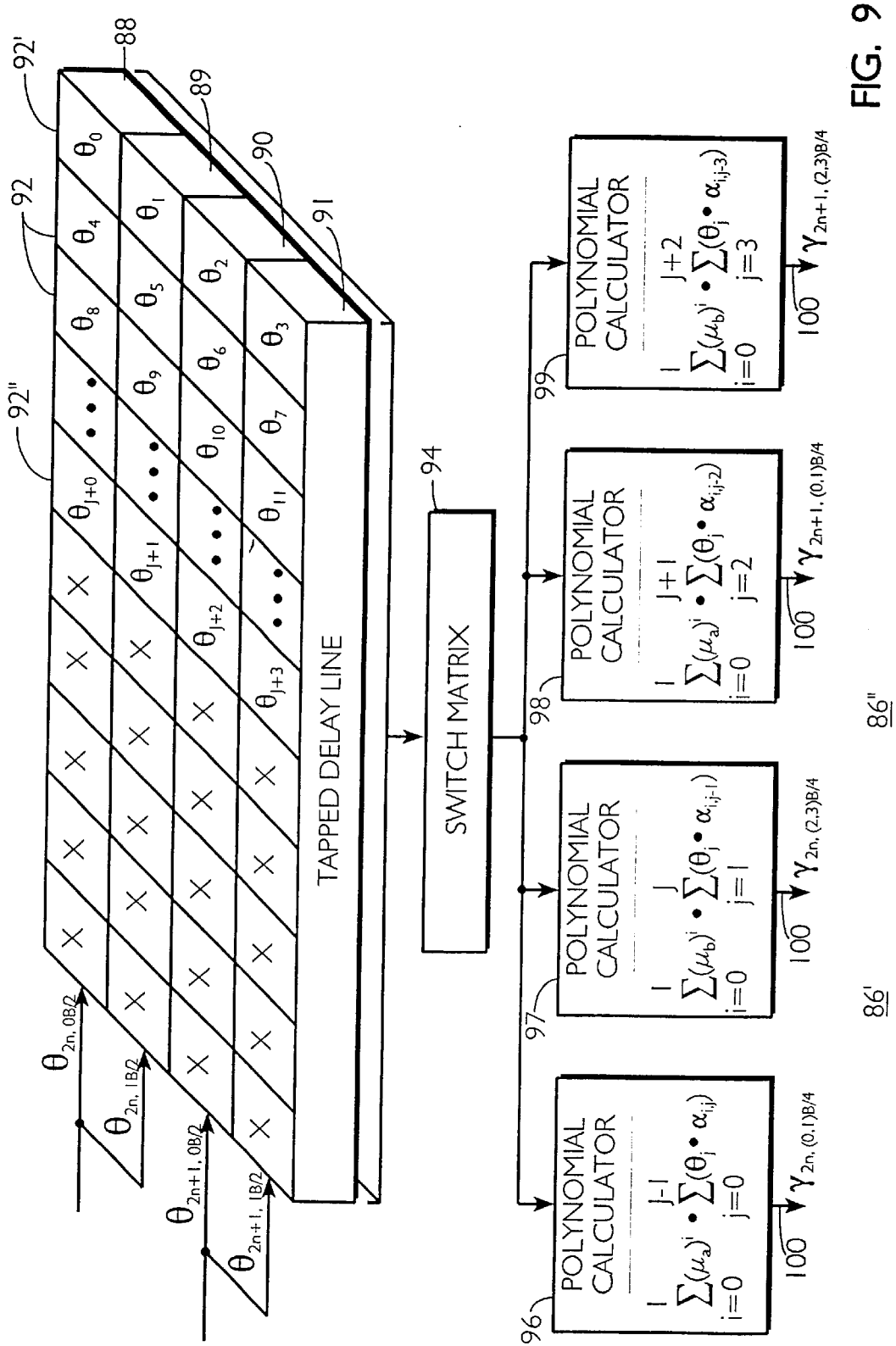
FIG. 9 shows a block diagram of an interpolator used in the IC modulation processor, the interpolator being configured in accordance with the dual chip embodiment of FIG. 5.

FIG. 9 shows a block diagram of a single interpolator which suffices for either of interpolators 86' or 86" on either of IC modulation processors 28 and is configured in accordance with the dual chip mode of operation. This single interpolator receives four combined, shaped substreams 76. Two of the combined shaped substreams 76 provide values $\theta_{2n,0B/2}$ and $\theta_{2n,1B/2}$ (FIG. 2) from IC modulation processor 28', and two of the combined shaped substreams 76 provide values $\theta_{2n+1,0B/2}$ and $\theta_{2n+1,1B/2}$ (FIG. 2) from IC modulation processor 28". Interpolators 86 on IC modulation processors 28' and 28" receive the same four combined, shaped substreams 76.

These four combined, shaped substreams 76 are routed into four tapped delay lines 88, 89, 90 and 91. Tapped delay lines 88–91 each include a series of cascaded delay stages 92, with a delay stage 92' being the stage containing the oldest values of θ of interest to interpolator 86, and a delay stage 92" containing the youngest values of θ of interest to interpolator 86. As indicated by "X's" in FIG. 9, tapped delay lines 88–91 may include other delay stages which contain data not used in interpolation calculations. Subscripts included on the values of θ shown in FIG. 9 indicate the data order. Values $\theta_0$, $\theta_4$, $\theta_8$, ..., $\theta_{J+0}$ represent data obtained from combined, shaped substream values $\theta_{2n,0B/2}$; $\theta_1$, $\theta_5$, $\theta_9$, ..., $\theta_{J+1}$ represent data obtained from combined, shaped substream values $\theta_{2n,1B/2}$; $\theta_2$, $\theta_6$, $\theta_{10}$, ..., $\theta_{J+2}$ represent data obtained from combined, shaped substream values $\theta_{2n+1,0B/2}$; and $\theta_3$, $\theta_7$, $\theta_{11}$, ..., $\theta_{J+3}$ represent data obtained from combined, shaped substream values $\theta_{2n+1,1B/2}$, with the data order being $\theta_0$, $\theta_1$, ..., $\theta_{J+3}$.

The combined, shaped substream values $\theta_0$, $\theta_1$, ..., $\theta_{J+3}$ are routed in various combinations through a switch matrix 94 to four polynomial calculators 96, 97, 98 and 99. Polynomial calculators 96–99 each represent a matrix of multipliers and adders configured to implement independent interpolation polynomials of a type known to those skilled in the art. FIG. 9 indicates generic interpolation polynomial equations for polynomial calculators 96–99. In these equations, the values $\theta_j$, with j varying from 0 to J+2 throughout polynomial calculators 96–99, define the type of signal routing accomplished by switch matrix 94. The polynomials calculators multiply various data values of θ by coefficients $\alpha_{i,j}$ where "i" indicates a filter branch of each polynomial calculator 96–99 and "j" indicates a coefficient index.

Each polynomial calculator 96–99 has a constant $\mu$ which defines a particular interpolation delay to be imposed by each polynomial calculator 96–99. Polynomial calculators 96 and 98 share the same interpolation value $\mu_a$ but operate on different data, and polynomial calculators 97 and 99 share the same interpolation value $\mu_b$ but operate on different data. Accordingly, each polynomial calculator 96–99 generates an interpolated substream 100 that digitally represents the combined shaped substreams 76 sampled at instants in time defined by the values of $\mu$.

In this dual mode configuration of modulator 20', coefficients $\alpha_{i,j}$ may be the same in corresponding polynomial calculators on different IC modulation processors 28, but interpolation constants $\mu_a$ and $\mu_b$ differ between the different IC modulation processors 28.

Referring to FIGS. 2 and 9, IC modulation processor 28' may be programmed with $\mu_a$ and $\mu_b$ values that generate interpolated substreams 100' containing samples γ corresponding to the zeroth (i.e. 0B/4) and second (i.e. 2B/4) quarters of each baud interval, while IC modulation processor 28" may be programmed with $\mu_a$ and $\mu_b$ values that generate interpolated substreams 100" which contain samples γ corresponding to the first (i.e. 1B/4) and third (i.e. 3B/4) quarters of each baud interval. During each clock cycle, two baud intervals worth of interpolated substream 100' and 100" samples γ are generated. The different baud intervals are denoted with the subscripts 2n and 2n+1, where n represents the clock cycle. Between interpolator sections 86' and 86" on IC modulation processors 28' and 28", a total of sixteen interpolated substreams 100 are generated. Each interpolated substream 100 produces a sample γ for each clock cycle. Eight interpolated substreams 100 provide samples γ for in-phase (I) components and another eight interpolated substreams 100 provide samples γ for quadrature (Q) components.

In the preferred embodiment, the control of switch matrix 94, the coefficients $\alpha_{i,j}$, and the values of $\mu$ are all programmed from external to IC modulation processor 28 and provided to interpolator 86 through a controller (not shown).

Figure 10:
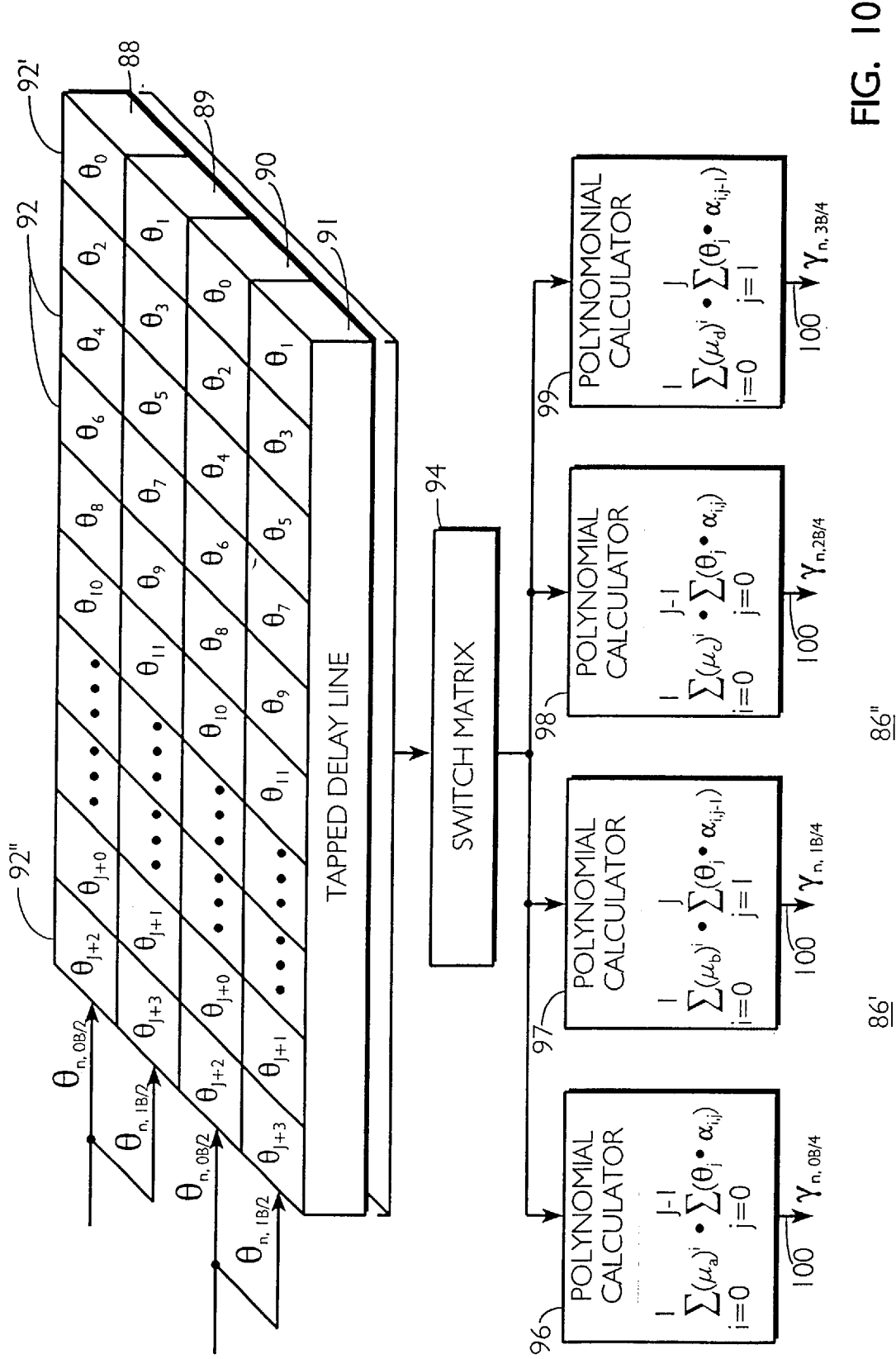
FIG. 10 shows a block diagram of the interpolator of FIG. 9 but configured in accordance with the single chip embodiment of FIG. 6.

FIG. 10 shows a block diagram of the interpolator of FIG. 9 but configured in accordance with the single chip mode of operation. Referring to the chart of FIG. 4 and to FIG. 10, compared to the dual mode configuration (FIG. 9), values of $\theta_0$, $\theta_1$, ..., $\theta_{J+3}$ are duplicated between tapped delay lines 88–89 and 90–91. This duplication is not required but is convenient in routing values of θ through switch matrix 94 to appropriate multipliers in polynomial calculators 96–99. The interpolation polynomials implemented by polynomial calculators 96–99 have the same form as when interpolator 86 operates in the dual chip mode. However, switch matrix 94 is programmed to route values of θ differently than when interpolator 86 operates in the dual chip mode. Moreover, four different interpolation constants $\mu_a$, $\mu_b$, $\mu_c$ and $\mu_d$ are used to interpolate the combined shaped substreams 76 so as to generate samples γ for the zeroth (i.e. 0B/4), first (i.e. 1B/4), second (i.e. 2B/4) and third (i.e. 3B/4) quarters of each baud interval. Baud intervals and clock cycles are both denoted by the subscript "n" in the chart of FIG. 4. A total of eight interpolated substreams 100 is generated. Each interpolated substream 100 produces a sample γ for each clock cycle. Four interpolated substreams 100 provide samples γ for in-phase (I) components and another four interpolated substreams 100 provide samples γ for quadrature (Q) components.

Referring back to FIGS. 5 and 6, the interpolated substreams 100 generated by interpolator sections 86 are routed within each IC modulation processor 28 to an optional precoder section 102. Precoder section 102 may implement precoding to reduce ISI in a manner known to those skilled in the art. For example, a version of the well known Tomlinson-Harashima precoding function may be implemented. However, in the preferred embodiment, precoding is omitted because it produces insufficient benefit when used with the preferred polar constellations implemented by phase mapper 50. However, other embodiments of modulator 20 may well implement different types of phase constellations and benefit from the inclusion of precoding.

Interpolated substreams 100 progress beyond precoder 102, when present, to a linearizer section 104. At this point, eight interpolated substreams 100 are provided on IC modulation processor 28. These eight interpolated substreams 100 also represent four complex interpolated substreams 100. One linearizer 106 is provided in linearizer section 104 for each complex interpolated substream 100.

Figure 11:
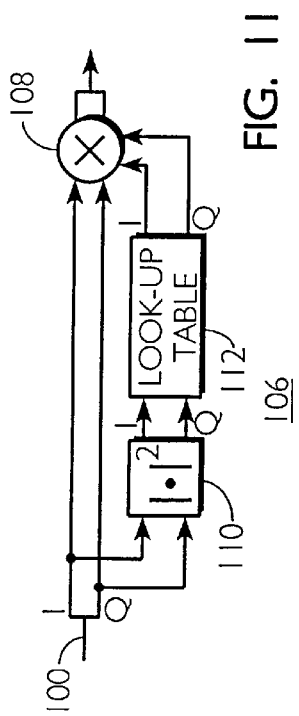
FIG. 11 shows a block diagram of an RF power amplifier linearizer used in the IC modulation processor of FIGS. 5 and 6.

FIG. 11 shows a block diagram of an RF power amplifier linearizer 106 which suffices for any of linearizers 106 included in linearizer section 104 (FIGS. 5–6). Referring to FIG. 11, a complex interpolated substream 100 is routed to an input of a complex multiplier 108 and to an input of a magnitude detector 110. An output of the magnitude detector 110 serves as an index input to a look-up table 112. An output from look-up table 112 couples to another input of multiplier 108. Of course, pipe-lining stages may be added as needed to accommodate timing requirements of magnitude detector 110 and look-up table 112.

Linearizer 106 compensates for non-linearities in the transfer function of RF power amplifier 38. Non-linearities represent amplifier transfer characteristics in which the amplifier output is not precisely proportional to its input. The types of RF power amplifiers 38 which are desirable and practical to use in digital communications modulators 20 may not possess ideal linear transfer characteristics. Non-linearities in the transfer function would, if not compensated, worsen spectral regrowth. The compensation imposed by linearizer 106 distorts the signal input to RF power amplifier 38 so that when amplified by the actual non-linear transfer function of RF power amplifier 38, the result is more nearly true linear amplification. The compensation transfer function is programmed into look-up table 112 by an IC modulation processor 28 controller (not shown). The programming in look-up table 112 may be altered from time-to-time in response to monitoring the output from RF power amplifier 38 (not shown).

Linearizer 106 is desirably a non-filtering linearizer. In other words, the amount of compensating distortion of the communications signal imposed by linearizer 106 for a given sample value is determined in response to that sample value rather than from that sample value in combination with previous and future sample values. Previous and future samples for the digital communications signal are processed in the other IC modulation processor 28 from where a current sample is passing through a linearizer 106. However, no cross-routing of interpolated substreams 100 generated on the different IC modulation processors 28 in the dual chip mode of operation is required because linearizer 106 is a non-filtering linearizer.

Since RF power amplifier 38 does not have a true linear transfer function, the compensating linearizer transfer function stored in look-up table 112 likewise fails to exhibit a true linear transfer function. Accordingly, spectral regrowth results from processing the data communication signal through linearizer 106 In other words, the bandwidth of the signal passing through linearizer 106 expands.

Figure 12:
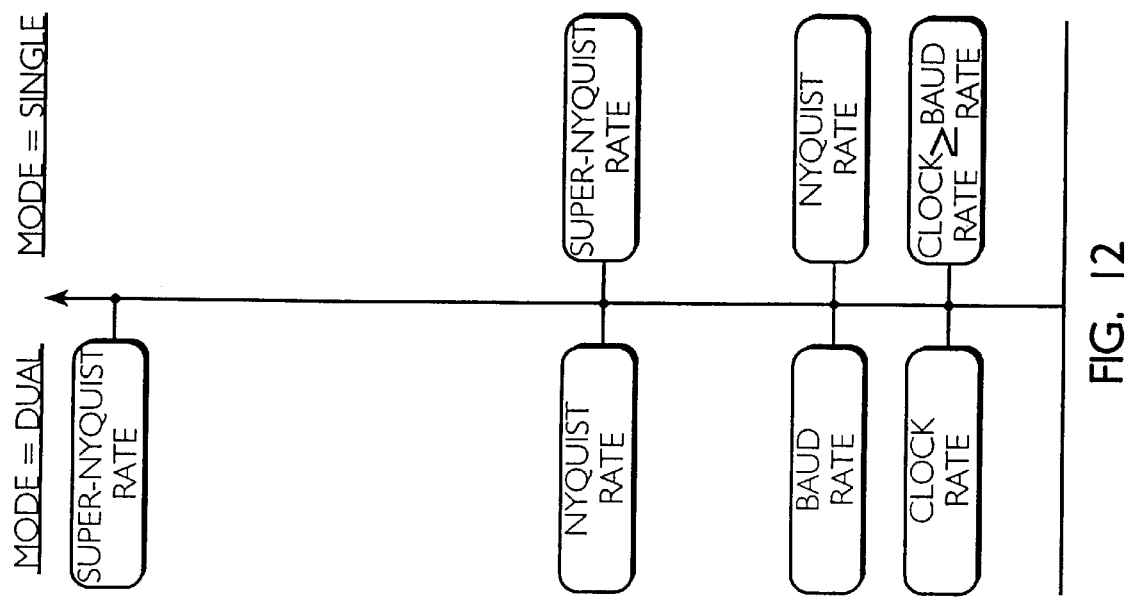
FIG. 12 shows a comparison chart of various rates supported by the dual chip and single chip modulator embodiments of FIGS. 1 and 2.

FIG. 12 shows a comparison chart of various rates supported by the dual chip and single chip modes of IC modulation processors 28. As indicated in FIG. 12 and discussed above, the baud rate is greater than the clock rate for either of IC modulation processors 28 configured in the dual chip mode, but the clock rate may be greater than or equal to the baud rate in the single chip mode of operating IC modulation processor 28. A Nyquist rate is approximately twice the baud rate in either mode of operation. This represents the minimum sample rate needed to accurately represent a signal digitally that conveys data at the baud rate. Samples at the Nyquist rate are collectively provided in combined, shaped substreams 76 (FIGS. 5–6), and the communications signal that is responsive to input data stream 22 (FIGS. 1 and 3) is accurately represented in digital form.

However, the Nyquist rate of samples is inadequate to digitally represent a signal that has spectral components above the baud rate. The linearized signal generated by linearizer 106 represents such a signal because the non-linear transfer function of linearizer 106 expands the bandwidth of this signal. Consequently, a Nyquist rate stream passing through linearizer 106 would experience aliasing in a manner that would fold aliased spectral components into the communications passband. For this reason, interpolation section 86 increases the sample rate above the Nyquist rate to a super-Nyquist rate. In the preferred embodiment, interpolation section 86 causes the digitized communication signal to be expressed in samples generated at four times the baud rate. Accordingly, the use of a super-Nyquist rate interpolated substream 100 to characterize the digitally represented communications signal passing through linearizer 106 reduces aliasing and causes most of any aliasing which may nevertheless occur due to the bandwidth expansion of linearizer 106 to be positioned outside the communications passband, where it can be easily removed by filtering (not shown).

Referring back to FIGS. 5–6, the linearized signals generated by linearizer section 104 are routed to a digital tuner section 114. For each of the four samples per clock conveyed by the four linearized signals, tuner section 114 performs a multiplication operation to digitally tune the communications signal to a desired intermediate frequency. The digitally tuned signal, which is expressed in four complex samples per clock cycle per IC modulation processor 28 then exits IC modulation processor(s) 28 and is passed to end components 42, as discussed above, for communication to a receiver.

In summary, the present invention provides an improved high speed digital communications modulator. The modulator can be configured to accomplish digital communications processing in IC modulation processors which operate at a clock rate below the baud rate. An integrated circuit (IC) modulation processor may be used in one mode to support baud rates up to the maximum clock rate of the IC modulation processor and in another mode with an identical IC modulation processor to support baud rates in excess of this maximum clock rate. A pulse shaping function is performed using two half-filters which may be located on the same IC modulation processor or on different IC modulation processors. An RF power amplifier linearizer is preceded by an interpolator that increases the number of samples per baud interval so that spectral components in excess of the baud rate introduced by the linearizer are not substantially aliased back into the communications passband.

Although the preferred embodiments of the present invention have been illustrated and described in detail, it will be readily apparent to those skilled in the art that various modifications and equivalents may be made therein without departing from the spirit of the invention or from the scope of the appended claims. For example, while FIGS. 5–12 disclose specific exemplary implementations of pulse shaping filters, selective delay elements, interpolators, linearizers, and the like, those skilled in the art will appreciate that the same functions can be implemented in alternate ways from those specifically disclosed herein. Moreover, while the above description is directed to an RF communications application, the present invention is not limited to use in RF applications, and a variety of high speed communication applications, include twisted pair, coaxial and optical cable, may benefit from the present invention.

What is claimed is:

1. A digital communications modulator comprising:

a phase mapper configured to generate a phase-mapped data stream;

a pulse shaping filter configured to generate a shaped data stream from said phase-mapped data stream;

an interpolator having an input responsive to said shaped data stream and having an output;

an RF power amplifier linearizer having an input responsive to said interpolator output and having an output; and an RF power amplifier having an input responsive to said RF power amplifier linearizer output.

2. A modulator as claimed in claim 1 wherein said interpolator generates an interpolated data stream to exhibit a data rate greater than a data rate of said shaped data stream.

3. A modulator as claimed in claim 1 wherein said RF power amplifier linearizer processes data at a rate greater than a data rate of said shaped data stream.

4. A modulator as claimed in claim 1 wherein said pulse shaping filter comprises:

a tapped delay line having a plurality of cascaded delay stages;

a coefficient scaling section coupled to said tapped delay line;

a summing section coupled to said coefficient scaling section; and a multiplexing section coupled to said tapped delay line to selectively enable a portion of said delay stages.

5. A modulator as claimed in claim 1 wherein:

said phase-mapped data stream provides phase point values at a predetermined baud rate;

said linearizer transforms said shaped data stream in accordance with a non-linear transfer function which generates spectral components in excess of said predetermined baud rate; and said interpolator is configured to generate a stream of interpolated samples at a rate greater than two times said predetermined baud rate to reduce aliasing in said linearizer.

6. A modulator as claimed in claim 1 wherein:

said shaped data stream to which said interpolator responds exhibits a predetermined data rate; and said interpolator is configured to operate in a first mode in which said interpolator output provides an interpolated stream having a data rate greater than said predetermined data rate and in a second mode in which said interpolated stream has a data rate equal to said predetermined data rate.

7. A modulator as claimed in claim 1 wherein said interpolator is configured to operate in a first mode in which said interpolator receives and processes a first number of samples per clock period and in a second mode in which said interpolator receives and processes a second number of samples per clock period, said first number being greater than said second number.

8. A modulator as claimed in claim 1 wherein said linearizer is a non-filtering linearizer.

9. A modulator as claimed in claim 1 wherein said phase mapper is a first phase mapper, said phase-mapped data stream is a first phase-mapped substream, said pulse shaping filter is a first pulse shaping filter, said shaped data stream is a first shaped substream, and said modulator additionally comprises:

a data splitter configured to split an input data stream into first and second input substreams, said first phase mapper being coupled to said data splitter to receive said first input substream;

a second phase mapper coupled to said data splitter, said second phase mapper being configured to generate a second phase-mapped substream from said second input substream;

a second pulse shaping filter coupled to said second phase mapper, said second pulse shaping filter being configured to generate a second shaped substream from said second phase-mapped substream; and a substream combiner, coupled to said first and second pulse shaping filters, for combining said first and second shaped substreams into a combined shaped substream which is responsive to said input data stream.

10. A modulator as claimed in claim 9 wherein:

said first pulse shaping filter resides on a first semiconductor substrate; and said second pulse shaping filter resides on a second semiconductor substrate.

11. A modulator as claimed in claim 9 wherein:

each of said pulse shaping filters operates at a phase point rate defined by a predetermined clock period; and said pulse shaping filters collectively process said input data stream at a rate of more than one phase point per clock period.

12. A modulator as claimed in claim 9 wherein:

a predetermined pulse-spreading transfer function can be applied through a FIR filter having a predetermined configuration of even and odd coefficients; and said first phase-mapped substream is processed in parallel by said first pulse shaping filter which implements said even coefficients of said FIR filter and said second pulse shaping filter which implements said odd coefficients of said FIR filter.

13. A modulator as claimed in claim 12 wherein:

said first phase-mapped substream comprises complex values having orthogonal components; and each of said first and second pulse shaping filters is provided substantially in duplicate to separately process said orthogonal components.

14. A method of modulating a digital communication data stream comprising:

a) shaping said digital communication data stream in a pulse shaping filter to generate a shaped data stream;

b) interpolating said shaped data stream to generate an interpolated data stream;

c) linearizing said interpolated data stream in an RF power amplifier linearizer to generate a linearized signal; and d) amplifying said linearized signal to generate a transmission signal.

15. A method as claimed in claim 14 wherein:

said shaped data stream provides phase point values at a predetermined baud rate;

said linearizing activity c) transforms said shaped data stream in accordance with a non-linear transfer function which generates spectral components in excess of said predetermined baud rate; and said interpolating activity b) generates a stream of interpolated samples at a rate greater than or equal to two times said predetermined baud rate to reduce aliasing in said linearized signal.

16. A method as claimed in claim 14 wherein:

said shaped data stream exhibits a predetermined data rate; and said interpolating activity b) operates in a first mode in which said interpolated data stream exhibits a data rate greater than said predetermined data rate and in a second mode in which said interpolated data stream exhibits a data rate equal to said predetermined data rate.

17. A method as claimed in claim 14 wherein said interpolating activity b) operates in a first mode to processes a first number of samples per clock period and in a second mode to process a second number of samples per clock period, said first number being greater than said second number.

18. A method as claimed in claim 14 wherein said shaped data stream exhibits a greater data rate than said interpolated data stream.

19. A method as claimed in claim 14 wherein said interpolating activity b) generates said interpolated data stream to exhibit a data rate greater than a data rate of said shaped data stream.

20. A method as claimed in claim 14 wherein said linearizing activity c) processes data at a rate greater than a data rate of said shaped data stream.

* * * * *

UNITED STATES PATENT AND TRADEMARK OFFICE
CERTIFICATE OF CORRECTION

PATENT NO. : 6,362,701 B1 Page 1 of 1
DATED : March 26, 2002
INVENTOR(S) : Brombaugh et al.

It is certified that error appears in the above-identified patent and that said Letters Patent is hereby corrected as shown below:

<u>Column 8,</u>
Line 44, delete "10".
Line 53, delete "20".

Signed and Sealed this

Eleventh Day of March, 2003

JAMES E. ROGAN
*Director of the United States Patent and Trademark Office*